United States Patent [19]

Yamashita

[11] Patent Number: 5,263,525
[45] Date of Patent: Nov. 23, 1993

[54] TIRE WITH A HIGH VISIBILITY EMBOSSED MARK

[75] Inventor: Fumikazu Yamashita, Kobe, Japan

[73] Assignee: Sumitomo Rubber Industries, Ltd., Kobe, Japan

[21] Appl. No.: 906,450

[22] Filed: Jun. 30, 1992

[30] Foreign Application Priority Data

Jul. 4, 1991 [JP] Japan .................................. 3-191009

[51] Int. Cl.$^5$ .............................................. B60C 13/00
[52] U.S. Cl. .................... 152/523; 152/524; 156/116
[58] Field of Search ............... 152/523, 524, DIG. 12; 40/587, 616; 156/116

[56] References Cited

U.S. PATENT DOCUMENTS

| 1,448,286 | 3/1923 | Comstock | 152/523 |
| 4,170,503 | 10/1979 | Buchanan et al. | 156/116 |
| 4,198,774 | 4/1980 | Roberts et al. | 152/523 |
| 4,343,342 | 8/1982 | McDonald | 152/523 |
| 4,823,856 | 4/1989 | Roberts | 152/523 |

FOREIGN PATENT DOCUMENTS

| 0253557 | 1/1988 | European Pat. Off. |
| 1435896 | 3/1966 | France |
| 1527568 | 4/1968 | France |
| 1551392 | 12/1968 | France |
| 2412426 | 7/1979 | France |
| 1142273 | 6/1967 | United Kingdom |
| 2010755 | 7/1979 | United Kingdom |
| 2114511 | 8/1983 | United Kingdom |

Primary Examiner—Michael W. Ball
Assistant Examiner—Richard Crispino

[57] ABSTRACT

A tire which is provided on a sidewall with an embossed mark (3), the embossed mark has an indent portion (5) and an outline portion (6), the outline portion has a top surface (6A) having a light color different from a dark color of the sidewall surface (2S) the bottom (5A) of the indent portion is provided with a rough surface to have a less luster than the sidewall surface, and preferably, the radial height of the mark is in the range from 15 mm to 60 mm, and the bottom of the indent portion is provided with a cross mesh pattern whose mesh pitches are 0.01 to 0.1 times the radial height H of the mark.

7 Claims, 8 Drawing Sheets

TIRE WITH A HIGH VISIBILITY EMBOSSED MARK

The present invention relates to a tire having an embossed mark on the surface of the tire sidewall.

BACKGROUND OF THE INVENTION

In general, a tire is provided in the sidewall portions with embossed marks to indicate, for example its trade mark, tire size, decorative diagram and the like.

In order to improve visibility of such a mark, white rubber has been used, wherein as shown in FIG. 8, the whole of the embossed mark (a) is made of white rubber protruding from the outer surface (b) of the tire sidewall. For the white color, in contrast with the black rubber sidewall, the visibility is improved in comparison with black embossed marks. However, as the white mark has a glossy flat top surface similar to the tire sidewall, the mark often becomes invisible at some view angle or direction with the tire view becoming unattractive.

SUMMARY OF THE INVENTION

It is therefore, an object of the present invention to provide a tire which is provided in a sidewall portion with a mark being improved in visibility and attractiveness.

According to one aspect of the present invention, a tire comprises a tread and sidewalls extending radially inwardly from the tread edges, at least one of the sidewalls provided on the outer surface thereof with an embossed mark, wherein the embossed mark has an indent portion and an outline portion, the outline portion protruding from the sidewall outer surface and extending along the outline of the indent portion, the outline portion provided with a top surface having a light color different from a dark color of the sidewall, the indent portion having a bottom indented from the top surface of the outline portion, and the bottom provided with a rough surface to have a less luster than the sidewall.

Preferably, the roughness is formed by a cross mesh pattern whose mesh pitches are 0.01 to 0.1 times the radial height H of the mark, and the radial height H of the mark is from 15 mm to 60 mm.

BRIEF DESCRIPTION OF THE DRAWINGS

Embodiments of the present invention will now be described in detail in conjunction with the accompanying drawings, in which.

DETAILED DESCRIPTION OF THE INVENTION

In this embodiment, the tire 1 is a pneumatic tire 1 comprising a tread portion, a pair of axially spaced bead portions and a pair of sidewall portions 2 extending from the tread edges to the bead portions.

The sidewall portions 2 are each provided with embossed marks 3.

Figure 1:
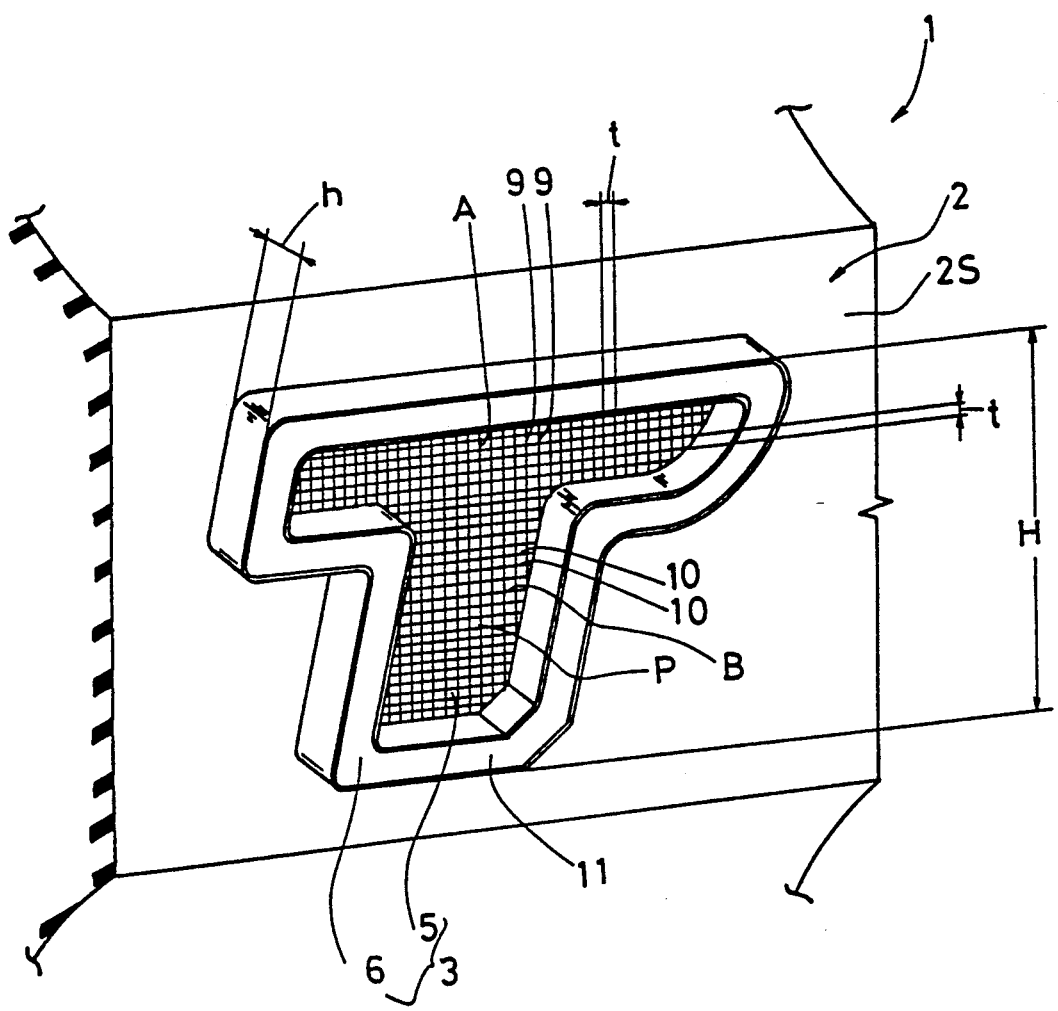
FIG. 1 is an enlarged partial perspective view of a tire according to the present invention showing an embossed mark in the sidewall thereof.

FIG. 1 shows one of the marks 3, which mark represents a letter "T".

The mark 3 comprises an indent portion 5 and an outline portion 6.

The outline portion 6 protrudes from the outer surface 2S of the tire sidewall portion 2, and extends around the T-shaped indent portion 5. In this example, therefore, the outline portion 6 extends continuously along the outline of the mark 3.

The outline portion 6 is made of a white rubber compound 11A.

The white rubber compound 11A is exposed at least at the top surface 6A of the outline portion 6 to present a white color, a light color.

In this embodiment, the outer side surface 6B and inner side surface 6C of the outline portion 6 are covered by a thin layer of a black rubber compound 11B to present a black color, a dark color.

The indent portion 5 is a hollowed part of the mark 3 having a bottom surface 5A indented from the top surface 6A of the outline portion 6.

The bottom surface 5A is provided with a mesh pattern (P) to provide roughness.

In this embodiment, the mesh pattern (P) is formed by a first group (A) of equispaced parallel straight lines 9 extending in a radial direction and a second group (B) of equispaced parallel straight lines 10 extending at a right angle to the above-mentioned radial direction so as to cross the radial lines 9.

The mesh pitches or the line spacings (t) in this example are constant in each of the groups (A, B) and the same value therebetween.

Figure 2:
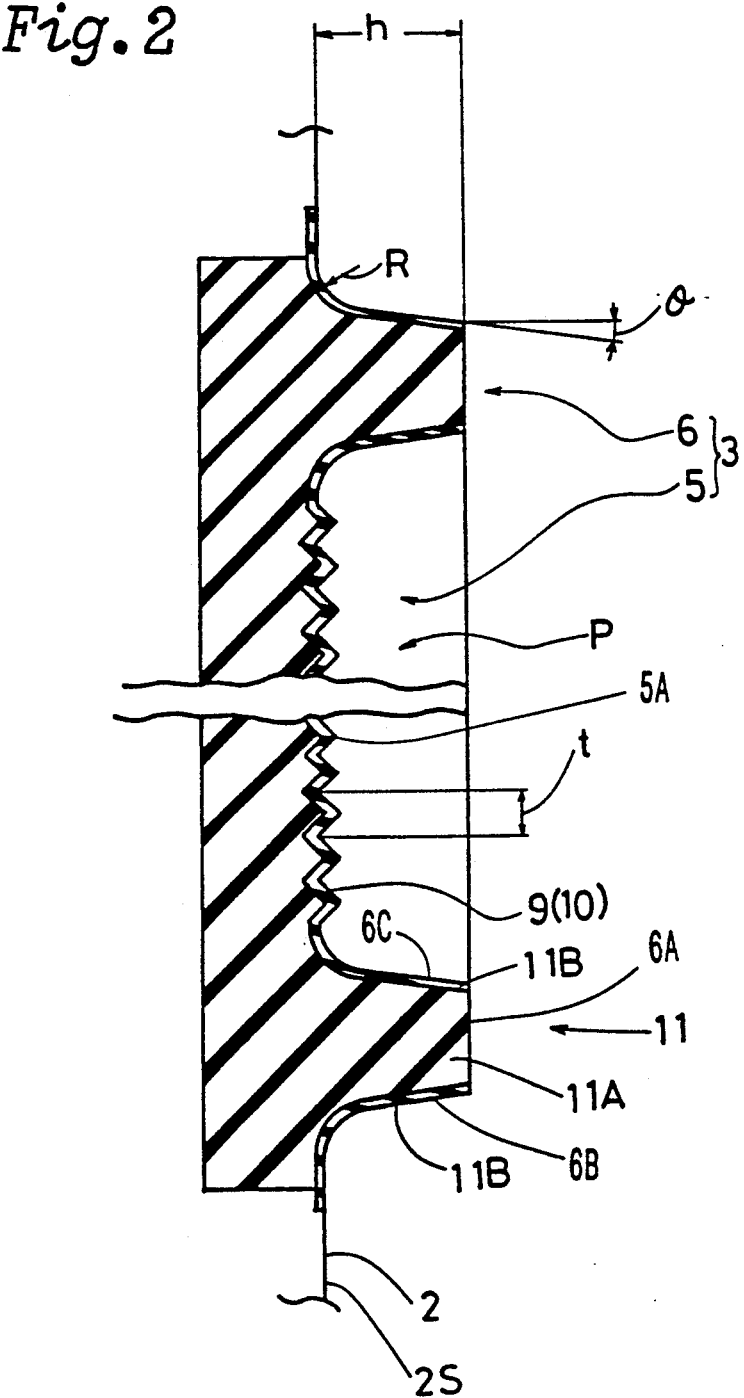
FIG. 2 is a cross sectional view of the mark.
Figure 3:
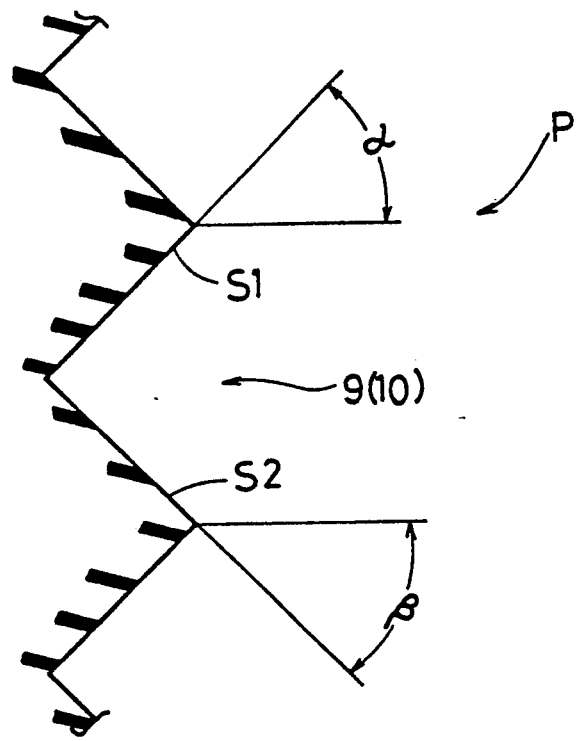
FIG. 3 is an enlarged cross sectional view of the surface of the indent portion of the mark showing the mesh pattern.

More particularly, the mesh pattern (P) in this example is formed by a number of small size dents of a right pyramid shape as shown in FIGS. 2 and 3.

The above-mentioned parallel straight lines 9 and 10 are the ridge lines formed between the adjacent dents.

As shown in FIG. 3, each dent has smooth sides (S1, S2) inclined at an angle (alpha, beta) in the range from 30 to 65 degrees with respect to the normal direction to sidewall surface, and the opposed sides (S1 and S2) intersect each other at the bottom so as to have a V-shaped cross section.

In this example, the inclination angle (alpha) of one of the opposed sides (Si and S2) is the same as the inclination angle (beta) of the other side, but they may be differed from each other.

The bottom surface 5A of the indent portion 5 is completely covered by a thin layer of the above-mentioned black rubber compound 11B to present a black color, a dark color. This layer is continued from the above-mentioned layer covering the inner side surface 6C of the outline portion 6.

In the above-explained example, the mesh pattern (P) is formed by a number of small size dents which are arranged in a number of rows in each of the two different directions, a radial direction and a direction crossing the radial direction at a right angle.

However, the mesh pattern (P) can be formed by a number of continuous narrow dents or grooves which comprises a first group (A) of equispaced parallel grooves 9 extending in a direction, for example a radial direction, and a second group (B) of equispaced parallel grooves 10 extending in a direction crossing the above-mentioned direction at for example, right angle.

In this case, each of the grooves 9 and 10 has a pair of opposed sides (S1 and S2) inclined at angles (alpha and beta) in the same manner as the above-explained example.

Accordingly, the bottom surface 5A diffuses the incident light.

For visibility of the mark and attractiveness of the tire view, it is preferable that the height H of the mark 3 measured radially between the radially inner most point to the radially outer most point of the mark is 15 mm to 60 mm, and the mesh pitches (t) are 0.01 to 0.1 times the mark height H.

If the height H is more than 60 mm, cracks are liable to occur between the outline portion 6 and the tire sidewall rubber when the sidewall is subjected to bending deformation.

For the similar reason, the amount (h) of protrusion of the outline portion 6 from the sidewall surface 2S is preferably less than 5 mm.

The outer side surface 11B of the outline portion 6 is inclined at an angle (theta) from 5 to 10 degrees with respect to the normal direction to the sidewall surface 2S towards the inside or center of the mark or the indent portion from the base to the top.

The corner between the outer side surface 11B and the sidewall surface 2S is rounded by a radius of curvature R of more than 1 mm.

The bottom surface 5A or the outermost point level thereof is the same level as or a higher level than the outer surface 2S.

Figure 4:
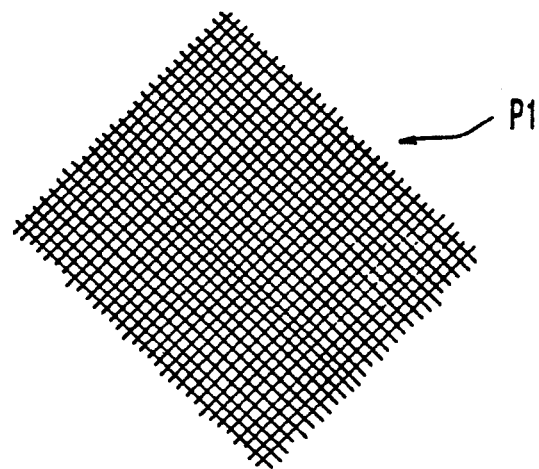
FIGS. 4(a) and 4(b) are views showing other examples of the mesh pattern.
Figure 4:
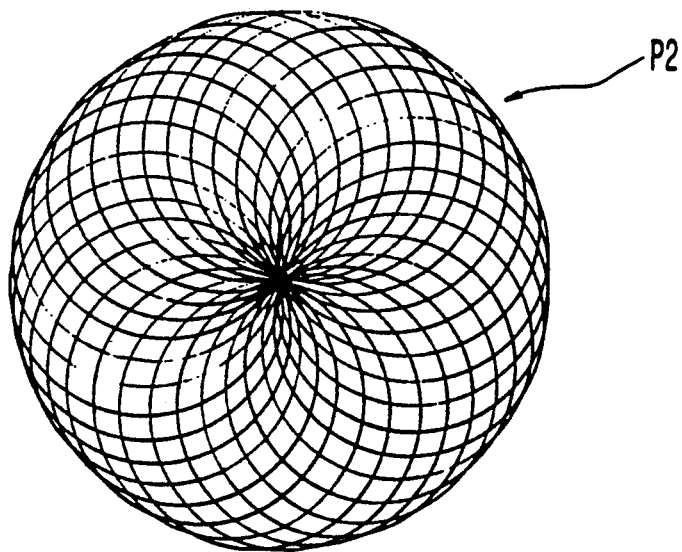

FIG. 4(a) shows another example of the mesh pattern, wherein the pattern (P1) is the substantially same as the above-mentioned pattern (P), but both the first group of straight lines 9 and the second group of straight lines 10 are inclined with respect to a radial direction.

FIG. 4(b) shows still another example of the mesh pattern, wherein the cross lines forming the mesh are curved such that a circle is revolved at regular pitch angles around a point defined thereon.

As explained above, those two examples of the mesh pattern (P) can be formed by either arranging a number of dependent small size dents or arranging a number of continuous grooves in two different directions.

Figure 5:
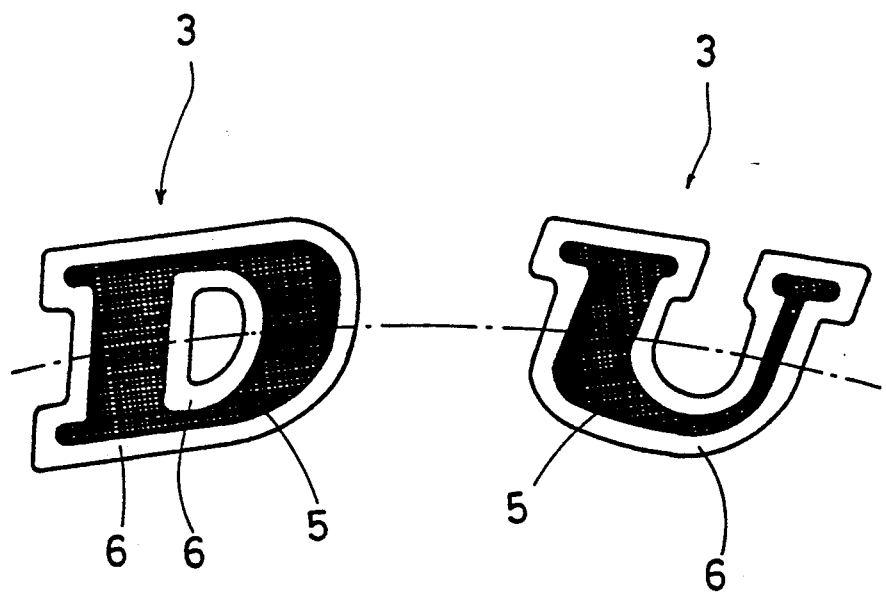
FIG. 5 is an enlarged plan view of another marked part of the sidewall showing other embossed marks.

FIG. 5 shows other embossed marks 3, which represent letters "D" and "U".

Figure 6:
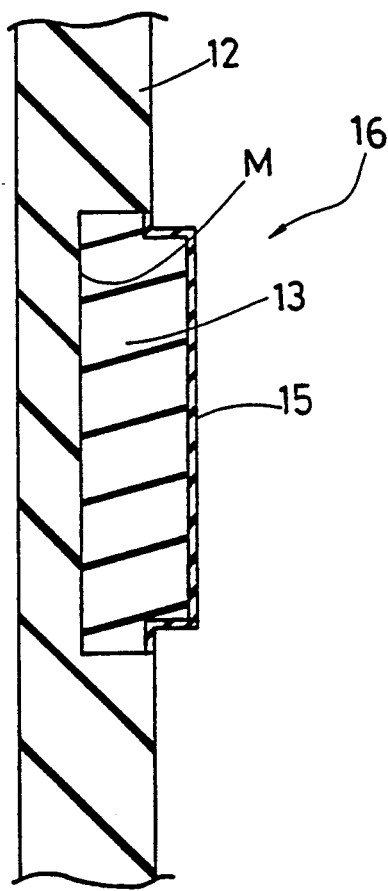
FIG. 6 is a cross sectional view explaining a method of making the mark.
Figure 7A:
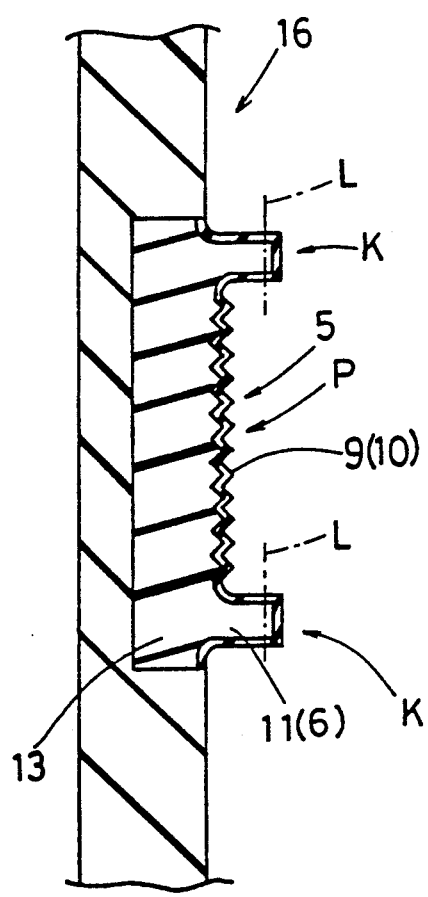
FIGS. 7(a) and 7(b) are cross sectional views explaining a method for making the mark.
Figure 7B:
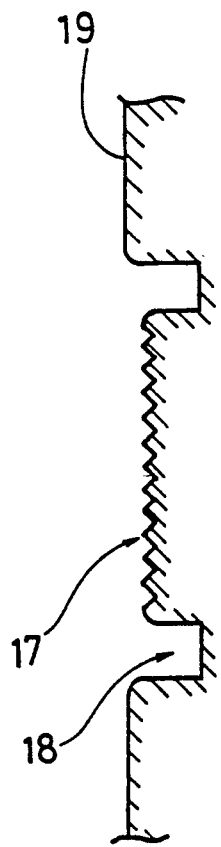
Figure 8:
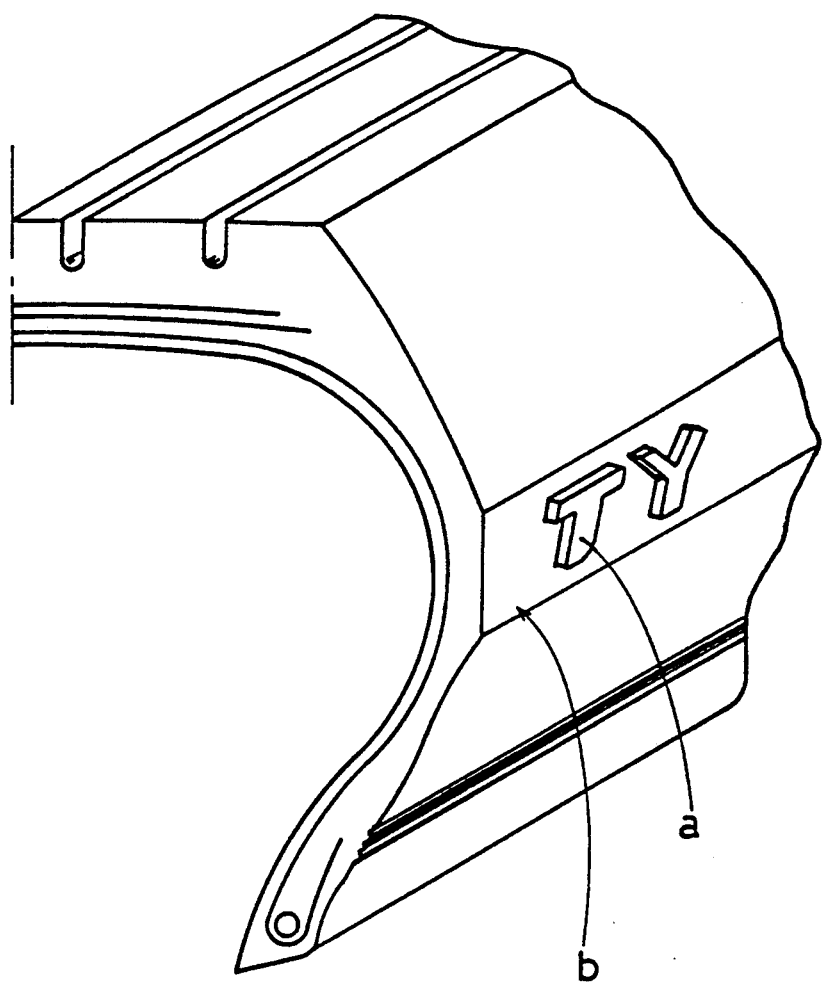
FIG. 8 is a partial perspective view of a tire according to a prior art.

FIGS. 6, 7(a) and 7(b) show a method of forming the mark 3.

The method comprises the steps of 1) forming a depression (M) at the place in a raw sidewall rubber strip 12 where the mark is formed;

2) putting a block of a raw white rubber compound 13 in the depression (M) so that the white rubber protrudes from the depression (M);

3) completely covering the white rubber block 13 by a thin strip 15 of a black rubber compound which is the same compound as the sidewall rubber strip 12;

4) vulcanizing the assembly 16 of those raw rubber materials or layers 12, 13 and 15 while pressing an negative impression 19 against the outside surface of the assembly 16, the negative impression 19 comprising a protruding portion 17 with a negative mesh pattern corresponding to the indent portion 5 and a depressed portion 18 corresponding to the outline portion 6; and 5) removing the thin black rubber layer 15 at only the top of the formed protruding part (K) which corresponds to the outline portion 6 so that the white rubber 13 appears, after the vulcanization has been done, by for example buffing to the level (L) shown in FIG. 7(a).

This method is incorporated into a conventional tire making method in which an assemble of raw tire materials, for example a tread rubber strip, sidewall rubber strips, a carcass, bead rubber strips and the like, is vulcanized using a mold having an inside face with a negative impression of the tire.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A tire comprising a tread and sidewalls extending radially inwardly from the tread edges,
   at least one of the sidewalls provided on the outer surface thereof with at least one embossed mark,
   said embossed mark having an indent portion and an outline portion,
   said outline portion protruding from the sidewall surface and extending along the outline of the indent portion,
   said outline portion provided with a top surface having a light color different from a dark color of the sidewall surface by a rubber having said light color,
   the indent portion having a bottom indented from the top surface of said outline portion,
   said bottom provided with a rough bottom surface by a cross mesh pattern to have a less luster than the sidewall surface,
   said rough surface completely covered by a rubber layer having a dark color different from said light color, and
   said outline portion having an outer side surface (6B) and an inner side surface (6C), each of said outer and inner side surfaces (6B and 6C) covered by a thin rubber layer having said dark color.

2. The tire according to claim 1, wherein the radial height H of said mark is in the range of 15 mm to 60 mm, and the pitches of the mesh are 0.01 to 0.1 times the radial height H of said mark.

3. The tire according to claim 2, wherein said mesh pattern is formed by a first group of parallel straight lines and a second group of parallel straight lines crossing said first group.

4. The tire according to claim 2, wherein said mesh pattern is formed by curved lines.

5. The tire according to claim 1, wherein the bottom surface of the indent portion is provided with a number of small flat portions inclined at an angle (alpha, beta) in the range from 30 to 65 degrees with respect to the normal direction to sidewall surface.

6. The tire according to claim 1, wherein said at least one of the sidewalls is provided with a plurality of said embossed mark, each said embossed mark having said outline portion extending continuously therearound.

7. The tire according to claim 1, wherein said outline portion extends continuously around the indent portion and includes an outside outline portion and an inside outline portion, the inside outline portion being within the outside outline portion.

* * * * *